(12) United States Patent
Urry et al.

(10) Patent No.: US 6,627,349 B2
(45) Date of Patent: Sep. 30, 2003

(54) ELECTRODE FOR AN ELECTROCHEMICAL CELL

(75) Inventors: Lewis F. Urry, Elyria, OH (US); John C. Bailey, Columbia Station, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 328 days.

(21) Appl. No.: 09/842,468

(22) Filed: Apr. 26, 2001

(65) Prior Publication Data

US 2002/0160262 A1 Oct. 31, 2002

(51) Int. Cl.[7] .......................... H01M 4/02; H01M 2/02; H01M 4/42
(52) U.S. Cl. ................. 429/209; 429/128; 429/229; 429/164; 429/165; 429/218.1; 429/27; 429/30; 429/31; 429/34
(58) Field of Search .................. 429/209, 128, 429/229, 218.1, 27, 30, 164, 165, 31, 34

(56) References Cited

U.S. PATENT DOCUMENTS

| | | | |
|---|---|---|---|
| 3,853,625 A | 12/1974 | Louzos | 136/30 |
| 3,957,532 A | 5/1976 | Settle et al. | 136/75 |
| 4,048,389 A | 9/1977 | Bubnick et al. | 429/101 |
| 4,158,084 A | 6/1979 | Prentice | 429/112 |
| 4,347,293 A * | 8/1982 | Goebel et al. | 429/105 |
| 4,403,020 A | 9/1983 | Dampier | 429/91 |
| 6,150,052 A | 11/2000 | Urry | 429/128 |

FOREIGN PATENT DOCUMENTS

| | | |
|---|---|---|
| JP | 7254406 | 10/1995 |
| WO | 9216978 | 10/1992 |
| WO | 9820569 | 5/1998 |

* cited by examiner

Primary Examiner—Patrick Ryan
Assistant Examiner—Angela J Martin
(74) Attorney, Agent, or Firm—Stewart A. Fraser

(57) ABSTRACT

An electrochemical cell and an electrode for use in an electrochemical cell is provided. The electrochemical cell has a container, a positive electrode disposed in the container and having a wall defining an interface surface, a negative electrode disposed in the container, a separator located between the positive and negative electrodes, and an electrolyte. The second electrode has a unitary piece of electrochemically active material having multiple openings formed in a circumferential surface. The unitary piece may include a slotted tube, first and second members, or a coiled strip.

38 Claims, 5 Drawing Sheets

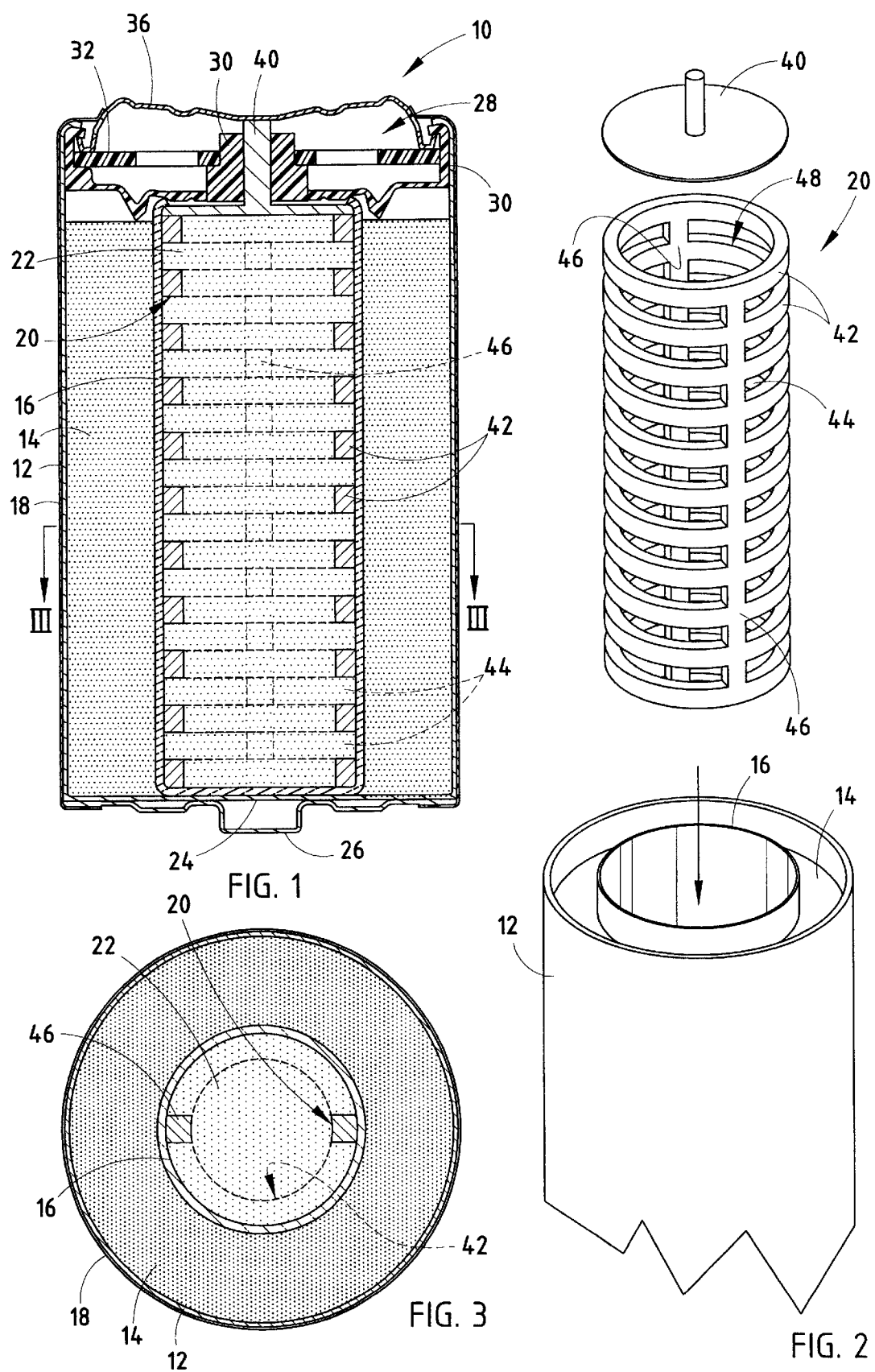

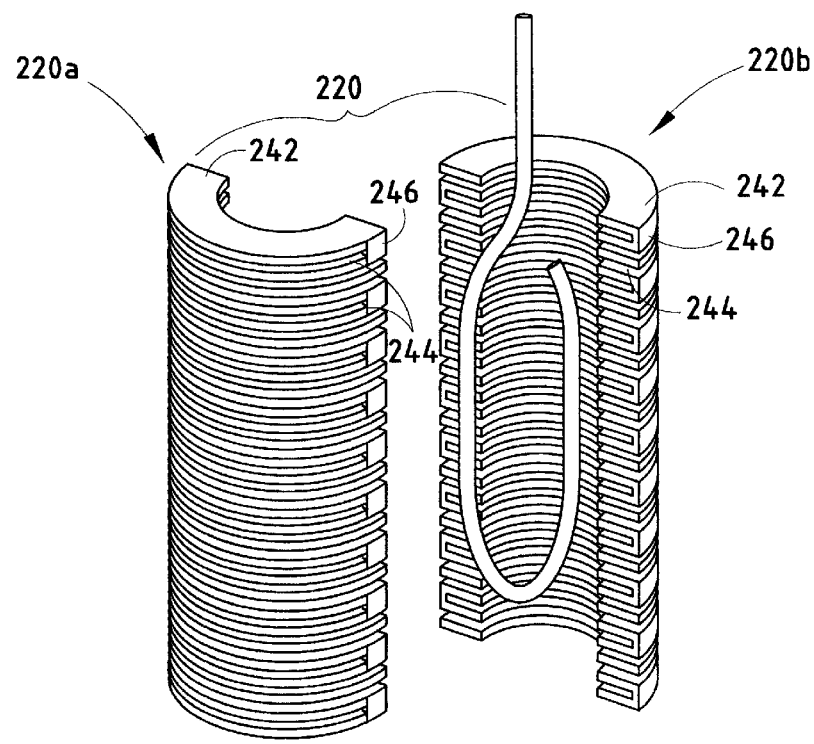
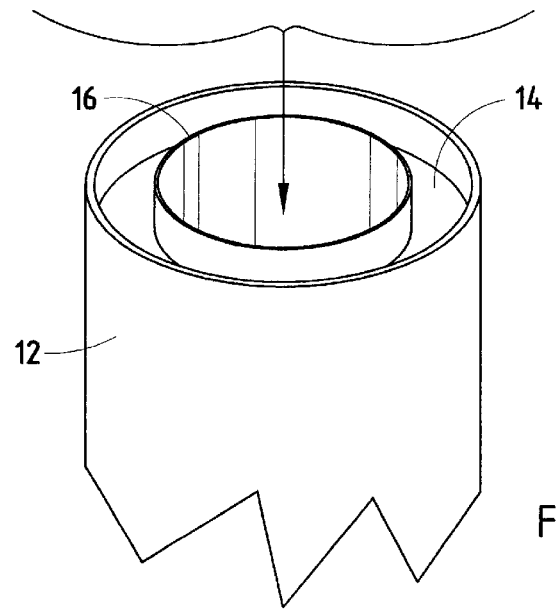
FIG. 8
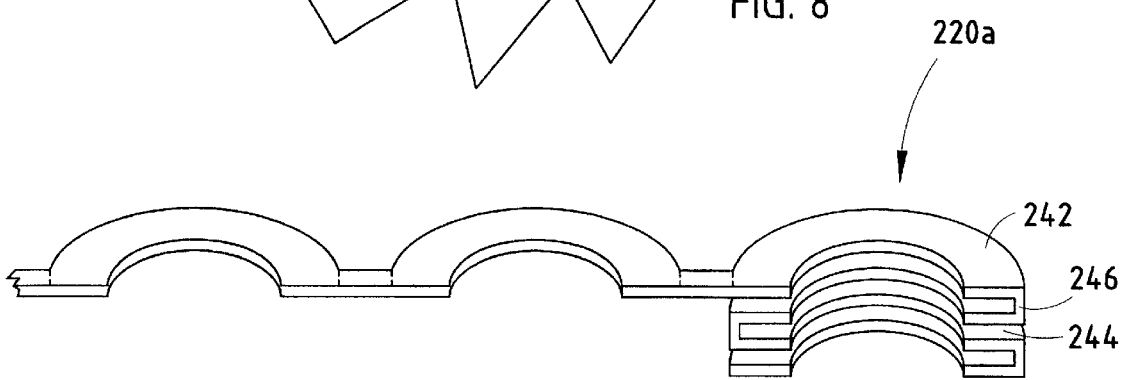
FIG. 10

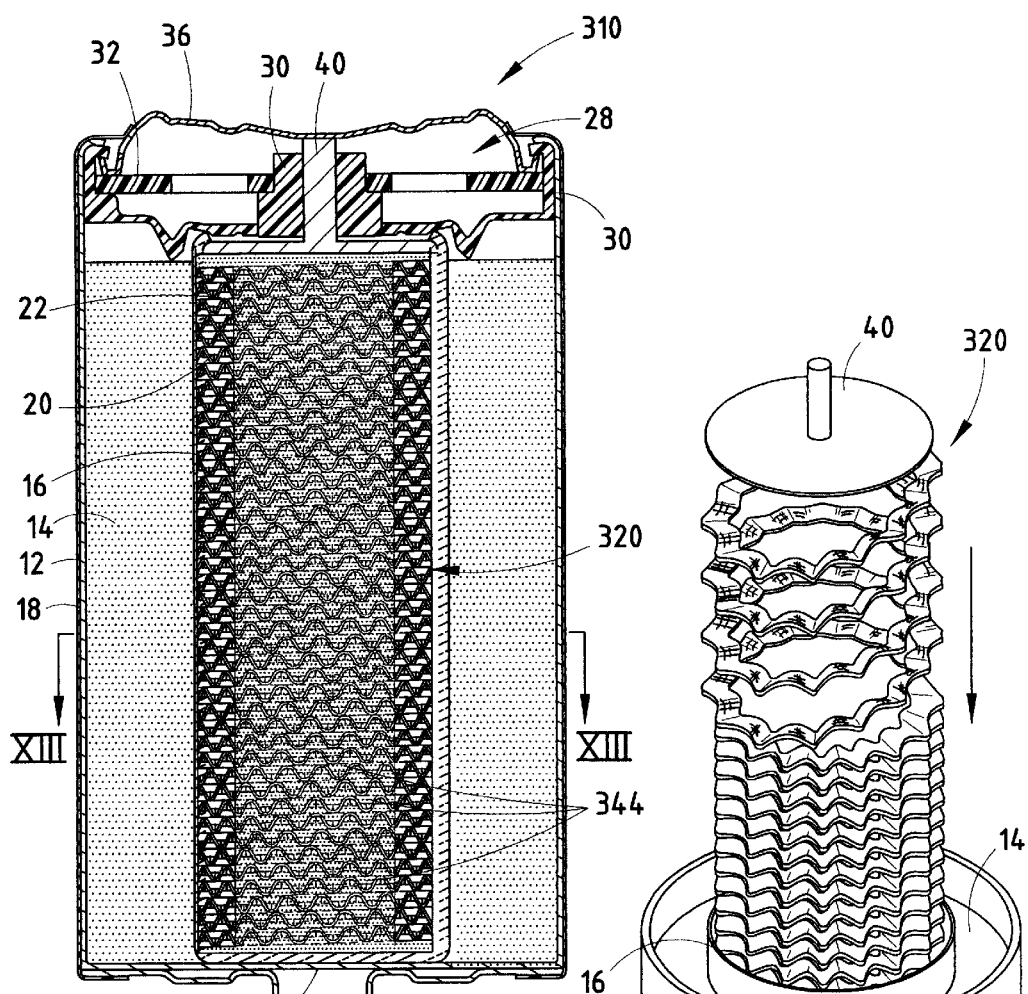
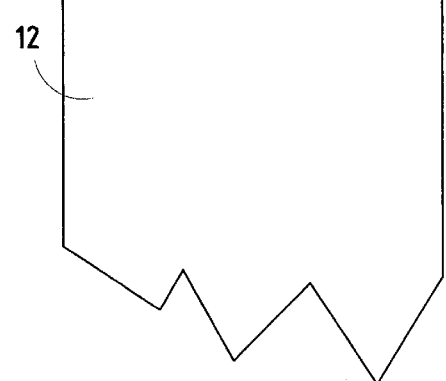
FIG. 12
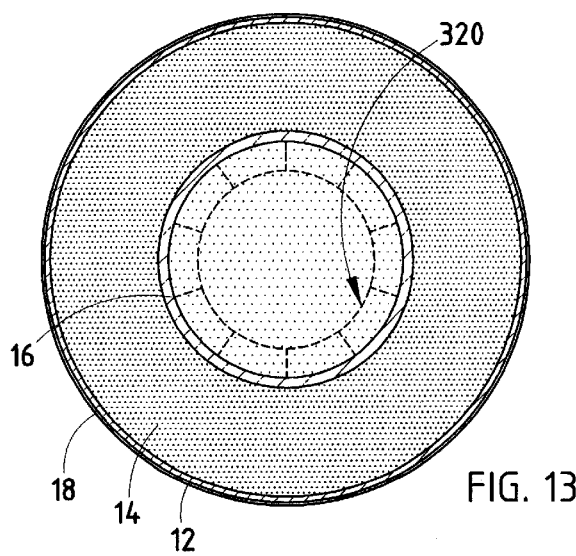
FIG. 13
FIG. 11

ELECTRODE FOR AN ELECTROCHEMICAL CELL

BACKGROUND OF THE INVENTION

The present invention generally relates to an electrochemical cell and, more particularly, relates to an improved electrode structure for an electrochemical cell.

Alkaline electrochemical cells (i.e., batteries) generally include a positive electrode, commonly referred to as the cathode, and a negative electrode, commonly referred to as the anode, arranged in a steel can and separated by a separator. The anode, cathode, and separator simultaneously contact an alkaline electrolyte solution which typically includes potassium hydroxide (KOH). In many conventional alkaline electrochemical cells, the cathode typically comprises manganese dioxide ($MnO_2$) as the electrochemically active material, and further includes graphite and other additives. The anode typically comprises zinc powder as the electrochemically active material. In addition, a gelling agent is also typically included in the anode to suspend the zinc powder in a gelled electrolyte mixture. The separator is disposed within the inside of the positive electrode to physically separate the positive electrode from the negative electrode while allowing ionic transport between the two electrodes.

The negative electrode is typically formed by mixing the zinc active material in the form of a zinc alloy powder with the alkaline electrolyte in a gelling agent. The zinc powder mix is dispensed within the hollow central volume defined by the interior surface of the separator within the positive electrode. Subsequently, a collector assembly is inserted into the open end of the steel can with a current collector nail extending down within the negative electrode/electrolyte gel. An outer cover is then placed over the collector assembly and the can walls are crimped over the outer cover to seal the cell can closed. It is generally known that, in the manufacture and use of electrochemical cells employing zinc particles, the lowest zinc volume percent in the negative electrode that manufacturers typically utilize is about no less than twenty-eight percent (28%) in the negative electrode gel in order to both match the rate of electrochemical output of the positive electrode and provide sufficient particle-to-particle and particle-to-collector contact to maintain the electrical conductance of the negative electrode. Below this amount of zinc particles, voltage instability typically occurs, as well as a resulting production of a cell structure having high sensitivity to shock and vibration, which cause the zinc particles to migrate away from the current collector and to lose particle-to-particle contact, thereby decreasing cell efficiency.

In order to provide the maximum electrochemical activity and a minimum of limiting polarization, it is desirable to operate a battery at as low a current density on the zinc as possible while still producing the required amount of total current from the system. Accordingly, alkaline batteries conventionally employ electrodes made from powdered active materials to obtain the highest possible surface area per unit weight or volume, and thus minimize the current density. Conventional zinc powder is powder that has been produced by air-jet atomization of molten zinc, thereby providing irregularly shaped particles. While zinc powder negative electrodes are relatively efficient at low discharge rates, such electrodes are much less efficient when discharged at high rates. Given that most new battery powered devices generally have high current demands, causing the batteries to discharge at high rates, there exists a strong demand for batteries having greater high-rate performance.

In addition to zinc powder, it is also generally known to employ zinc flakes having a thickness many times smaller than the length and width. However, while the use of zinc flakes improves the high-rate performance of the negative electrode of an alkaline electrochemical cell, there remains room for further improving negative electrode performance, particularly at high drain rates.

It has been discovered that the discharge of zinc in an alkaline cell generally starts near the positive electrode and then proceeds away from the positive electrode. Because the reaction product (e.g., zinc oxide and zinc hydroxide) resulting from the discharge of zinc is more voluminous than the zinc itself, a reaction product skin tends to form between the positive and negative electrodes if there is not enough space to accommodate the reaction product. While such a skin still allows some electrolyte to pass through, the reacting zinc behind the skin does not receive hydroxyl ions from where they are formed in the positive electrode fast enough to offset those consumed by the reacting zinc. As a result, polarization occurs, leading to premature cell failure.

In many cell designs, the current collector, which is often in the form of a nail, is located in the center of the negative electrode. Because most of the zinc discharge occurs at the outer periphery of the negative electrode near the positive electrode interface, it is necessary to maintain a continuous path of connected zinc from the reacting site to the collector nail so as to facilitate electron transfer. When zinc powders or flakes are used, many particles must touch to form an electron conduction path back to the collector nail. However, because the zinc powder or flakes only constitute approximately thirty percent (30%) of the negative electrode volume, any physical shock to the cell may cause the particles to shift and lose contact. Thus, excess zinc is often added to the negative electrode only to serve as an electron conductor. The excess zinc, however, is not discharged during the life of the cell and takes up valuable space within the cell that could otherwise be used for extra electrolyte to fuel reactions or to hold discharge reaction product while still leaving space for ion transfer. Alternatively, some of the space could be used to increase the amount of active material (e.g., $MnO_2$) in the positive electrode.

U.S. Pat. No. 6,150,052, entitled "ELECTRODE FOR AN ELECTROCHEMICAL CELL INCLUDING STACKED DISKS," by Lewis F. Urry, teaches a negative electrode formed with a plurality of individually stacked zinc disks. The aforementioned patent disclosure is hereby incorporated by reference. The stacked zinc disks generally discharge with enhanced efficiency at high currents, as compared to a homogenous suspension of zinc powder. While enhanced performance is achieved with the zinc disks, it is desirable to provide an electrode structure that is easy to manufacture and assemble in an electrochemical cell, and which achieves high efficiency at high discharge rates.

SUMMARY OF THE INVENTION

The present invention improves the performance of an alkaline electrochemical cell for at least high rate service and provides an electrode that is relatively easy to assemble. To achieve these and other advantages, the present invention provides for an electrochemical cell having a container, a first electrode disposed in the container, a second electrode disposed in the container, a separator located between the first and second electrodes, and an electrolyte. The first electrode has a wall defining an interface surface. The second electrode includes a unitary piece of electrochemically active material having a circumferential surface with multiple openings formed in the circumferential surface.

According to a first aspect of the present invention, the unitary piece of electrochemically active material comprises a slotted tube having a spine and a plurality of ribs supported by the spine. According to another aspect of the present invention, the unitary piece of electrochemically active material comprises first and second members each having a spine and a plurality of ribs. According to a third aspect of the present invention, the unitary piece of electrochemically active material comprises first and second members each comprising a folded sheet of electrochemically active material. According to a fourth aspect of the present invention, the unitary piece of electrochemically active material comprises a coiled piece of material having overlapping layers.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is a cut-away schematic of an electrochemical cell constructed in accordance with a first embodiment of the present invention;

FIG. 2 is an exploded perspective view of a negative electrode constructed in accordance with the first embodiment of the present invention;

FIG. 3 is a cross-sectional view taken through line III—III of FIG. 1;

FIG. 8 is an exploded perspective view of a negative electrode constructed in accordance with the third embodiment of the present invention;

FIG. 10 is a perspective view of a sheet of electrode material being folded to form one-half of the negative electrode shown in FIG. 8;

FIG. 11 is a cut-away schematic of an electrochemical cell constructed in accordance with a fourth embodiment of the present invention;

FIG. 12 is an exploded perspective view of a negative electrode constructed in accordance with the fourth embodiment of the present invention; and FIG. 13 is a cross-sectional view taken through line XIII—XIII of FIG. 11.

DETAILED DESCRIPTION OF THE PREFERRED EMBODIMENTS

Figures 4, 5, 6:
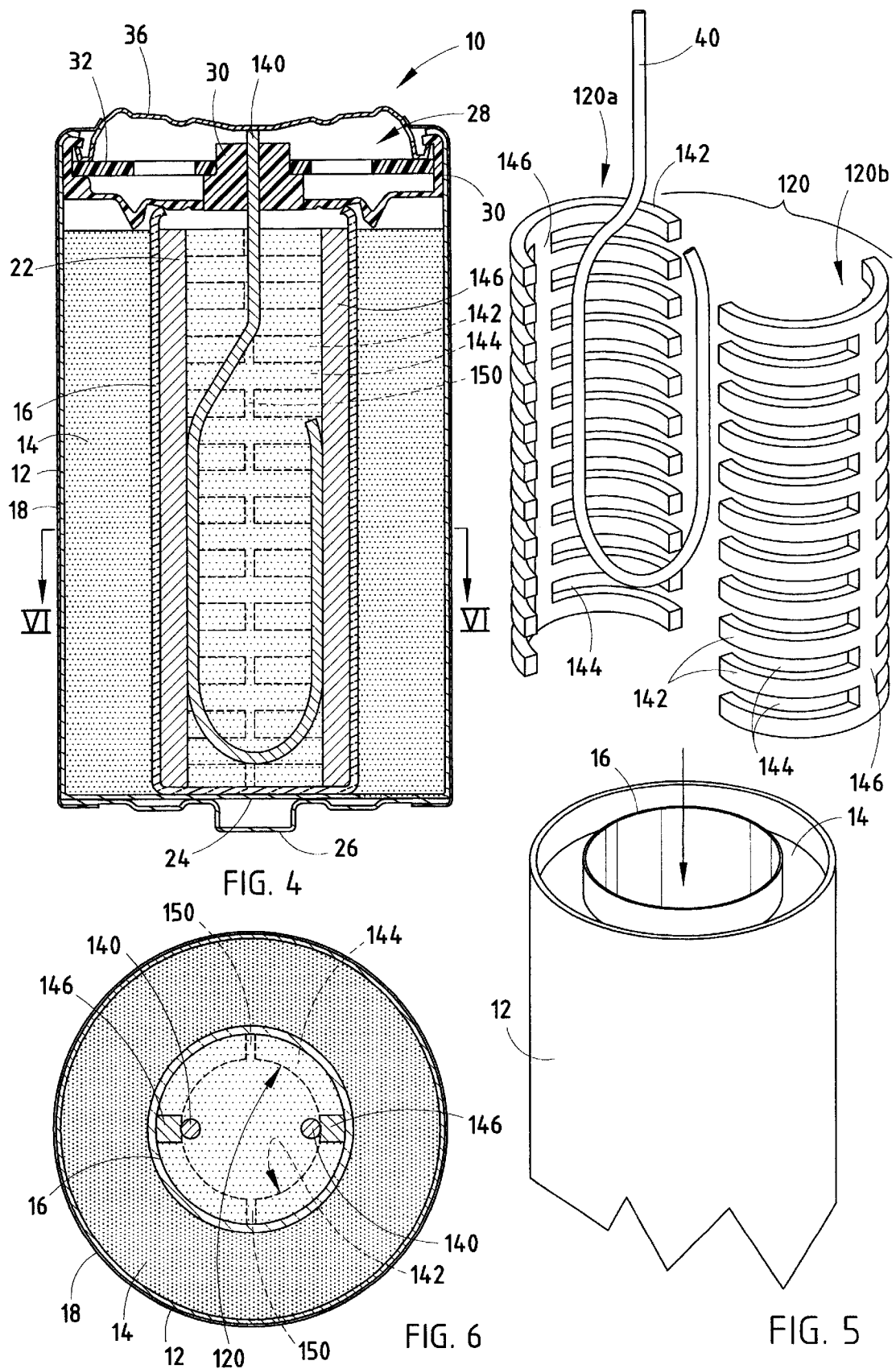
FIG. 4 is a cut-away schematic of an electrochemical cell constructed in accordance with a second embodiment of the present invention.
FIG. 5 is an exploded perspective view of a negative electrode constructed in accordance with the second embodiment of the present invention.
FIG. 6 is a cross-sectional view taken through line VI—VI of FIG. 4.

Referring to FIG. 1, a cylindrical alkaline electrochemical cell 10 is shown in a cutaway view constructed with an electrode in accordance with a first embodiment of the present invention. The electrochemical cell 10 generally includes a steel can 12 having a cylindrical side wall, a closed bottom end 24, and an open top end 28. A metalized, plastic film label 18 is formed about the exterior surface of the steel can 12, except for the ends of the steel can 12. At the closed end of steel can 12 is a positive cover 26 preferably formed of plated steel and having a protruding nub.

The electrochemical cell 10 includes a positive electrode, also referred to herein as the cathode 14, formed about the interior surface of steel can 12. According to one example, the cathode 14 may be formed of a mixture of manganese dioxide, graphite, and electrolyte solution containing potassium hydroxide (KOH) and water, and optional additives. Cathode 14 is shaped as a hollow cylinder having an inner wall that defines an interface surface and a cavity. Positive electrode 14 may be impact molded inside of steel can 12 or inserted as a plurality of rings after molding. Electrochemical cell 10 further includes a separator 16 that lines the inner wall of the hollow cavity within cathode 14.

As described in further detail below, a negative electrode 20, hereinafter also referred to as the anode, is deposited within the separator-lined hollow cavity of the cathode 14. An alkaline electrolyte 22, such as KOH, is also dispensed within the lined hollow cavity of the cathode 14 and preferably substantially consumes a cavity (aperture) provided centrally within the anode 20. The electrochemical cell 10 includes a collector assembly for sealing closed the open top end 28 of the steel can 12. The collector assembly includes a current collector 40, an annular polymeric seal 30, and an inner metal cover 32. The annular seal 30 contacts the inner metal cover 32 and prevents leakage of active materials contained in steel can 12. A negative outer cover 36, which is preferably formed of plated steel, is disposed in contact with the current collector 40 via a weld or pressure contact. Negative cover 36 is electrically insulated from steel can 12 via seal 30. The steel can 12 is crimped inward at the open end to form the sealed closure. It is contemplated that other cathodes, separators, containers, and collector and seal assemblies may be employed in use with various types of electrochemical cells with the various embodiments of the anode according to the present invention.

The present invention provides for an electrochemical cell having an anode configured with multiple openings formed in the circumferential surface. According to the first embodiment of the present invention, the anode 20 is formed as a slotted tube of electrochemically active material as shown in FIG. 2. The slotted tube anode 20 includes a plurality of parallel circumferential ribs 42 interconnected and supported by a pair of upstanding spines 46. Spines 46 are perpendicular to ribs 42 and provides support and electrical continuity throughout the anode 20. Adjacent ribs 42 are separated via slots (openings) 44 extending through the entire cylindrical wall of the anode 20 from the outer circumferential surface to the inner surface. The slotted tube anode 20 has an open cavity 48 provided in the central region. The slots 44 and cavity 48 are formed as a continuous open volume.

The slotted tube anode 20 may be formed by forming a cylindrical hollow tube of electrochemically active material, such as zinc, and cutting parallel slots 44 in the tube to remove material, thereby leaving the plurality of ribs 42 and spines 46. Alternately, anode 20 could be molded from molten zinc compound to achieve the desired slotted tube configuration. While eleven ribs 42 and two spines 46 are shown in this embodiment, it should be appreciated that any number of a plurality of ribs 42 may be employed, and any number of one or more spines 46 may be employed.

The current collector 40 includes a metal disk at the lower end and a brass nail extending upward therefrom. Current collector 40 contacts the upper end of anode 20, particularly on the upper surface of the uppermost rib 42, to provide a conductive path to the outer negative terminal 36. It should also be appreciated that the metal disk of current collector 40 may include electrochemically active material.

The anode 20 is made up of electrochemically active material, preferably of a zinc compound. The zinc compound may include a zinc alloy including at least one of the metals selected from the group consisting of bismuth, indium, calcium, and aluminum. The electrochemically active material may include impact pressed powder or a solid structure formed by cooling a molten material.

The slotted tube anode 20 is inserted within the separator 16 lined within the inner hollow surface of cathode 14. As shown in FIGS. 1 and 3, the ribs 42 and spines 46 preferably contact the separator 16. Ribs 42 extend substantially perpendicular to the interface surface of the cathode inner walls, and are therefore substantially perpendicular to the cell height (i.e., longitudinal axis), while the spines 46 run substantially parallel to the cell height. The alkaline electrolyte 22 substantially fills the inner cavity 48 of slotted tube anode 20, and electrolyte further consumes the volume provided in slots 44, between adjacent ribs 42. The alkaline electrolyte 22 preferably includes a precipitating agent, such as zinc silicate or zinc sulfide, suspended in the gelled electrolyte. The precipitating agent influences precipitation of zinc oxide within the central cavity 48 such that the formation of zinc oxide occurs away from the zinc metal. The gelled electrolyte may include a gelling agent, such as Carbopol® and, more particularly, Carbopol® 940 (C940), which is manufactured and made available by B.F. Goodrich Specialty Chemicals.

The central hollow cavity 48 formed in slotted tube anode 20 also serves as a spacer to concentrate the active electrochemical materials close to the positive electrode 14 and provides a volume for the reaction product and a reservoir for holding electrolyte. The slots 42 formed in anode 20 allow for enhanced ion and water transfer and further provide additional space for reaction product and electrolyte, while the spines 46 allow for electric continuity throughout the zinc anode 20.

An electrochemical cell 110 is illustrated in FIGS. 4–6 having a negative electrode 120 and a current collector 140 according to a second embodiment of the present invention. With the exception of the negative electrode (anode) 120 and current collector 140, the remainder of electrochemical cell 110 is substantially similar to cell 10, and therefore identical reference numerals are used to reference similar elements.

With particular reference to FIG. 5, the anode 120 includes a pair of slotted semi-cylindrical anode members 120A and 120B formed of electrochemically active material, such as a zinc compound, as described above. Each of the slotted semi-cylindrical members 120A and 120B are slotted and include a plurality of substantially parallel circumferential ribs 142 interconnected and supported by an upstanding spine 146. Slots (openings) 144 are formed between adjacent ribs 142. The spine 146 is preferably centered between the ends of ribs 142 such that the ribs 142 are substantially symmetric on opposite sides of the spine 146.

The first slotted semi-cylindrical anode member 120A is disposed on one side of the cell against the inner walls of the separator 16. Anode member 120A extends through an angular rotation of slightly less than one hundred eight degrees (180°). The second slotted semi-cylindrical anode member 120B is likewise disposed against the inner walls of the separator on the opposite side of the cell, and also extends through an angular rotation of slightly less than one hundred eighty degrees (180°). Accordingly, the two slotted semi-cylindrical anode members 120A and 120B are diametrically opposed to each other such that they face each other within the separator 16, and are separated at the ends of the ribs 142 by a small separation gap 150, as shown in FIG. 6.

The current collector 140 is made of a conductive metal and includes an upper shaft extending through annular seal 30 and contacting the outer negative terminal 36. The current collector 140 further includes a J-shaped or U-shaped lower section with the vertical members contacting both the first and second semi-cylindrical slotted members 120A and 120B of negative electrode 120, preferably along an interior surface of the spine 146. The current collector 140 is oversized relative to the positioning of the first and second semi-cylindrical members 120A and 120B and provides a biased force radially outward to force the first and second semi-cylindrical slotted members 120A and 120B radially outward apart from one another and against the separator 16 in closer proximity to the positive electrode 14. By employing at least two diametrically opposed semi-cylindrical anode members 120A and 120B forcefully biased outward against the separator 16, the separation distance between the anode 120 and cathode 14 is minimized, thereby enhancing ion permeation, resulting in enhanced discharge service performance. It is preferred that the current collector 140 contact the spine 146 of each of semi-cylindrical members 120A and 120B since the spines 146 are generally stronger and more supportive as compared to the ribs 142.

Figure 7:
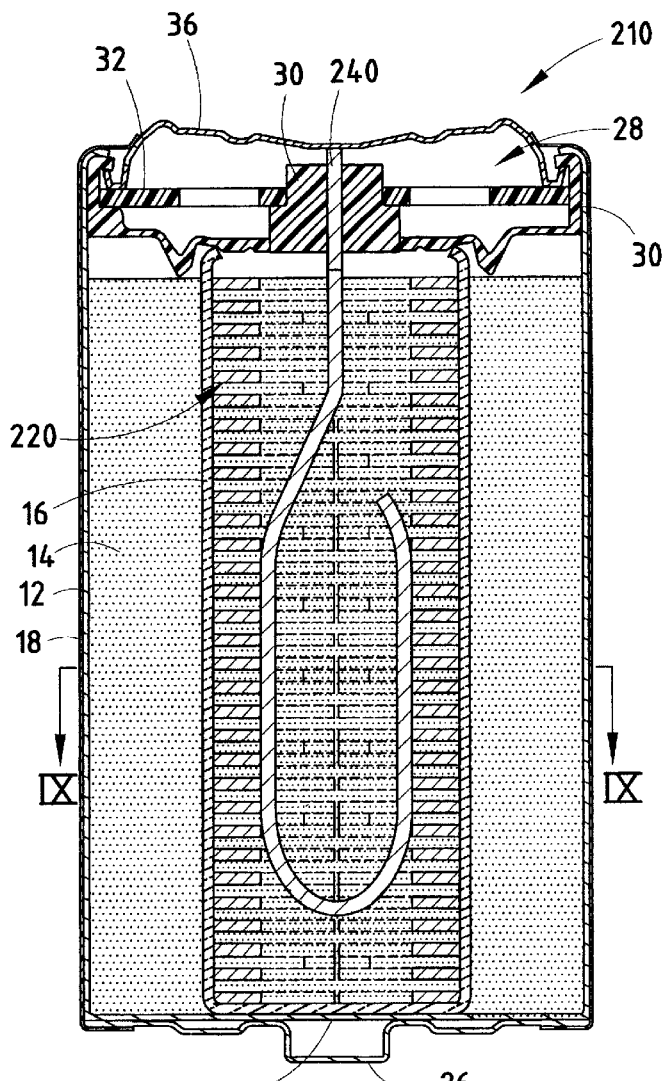
FIG. 7 is a cut-away schematic of an electrochemical cell constructed in accordance with a third embodiment of the present invention.
Figure 9:
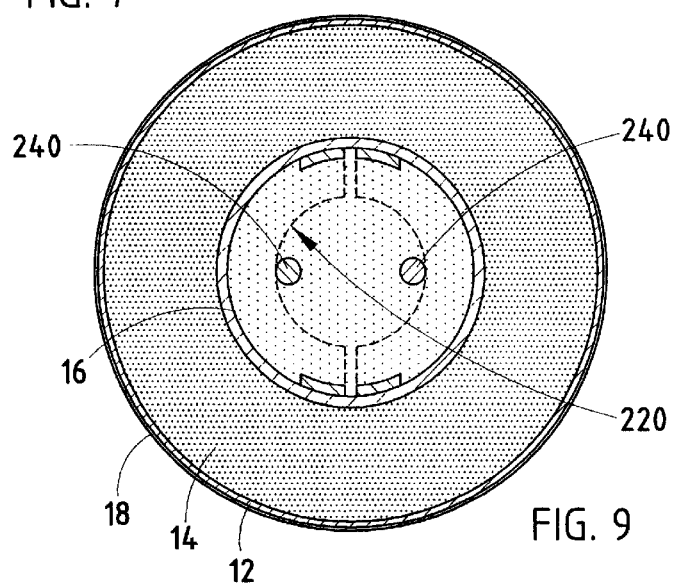
FIG. 9 is a cross-sectional view taken through line IX—IX of FIG. 7.

An electrochemical cell 210 is illustrated in FIGS. 7–9 having a negative electrode 220 and current collector 240 configured according to a third embodiment of the present invention. The current collector 240 is substantially similar to current collector 140 as described above in connection with the second embodiment. With the exception of the negative electrode 220 and current collector 240, the same reference numerals are used to identify similar features described above in connection with cells 10 and 110.

With particular reference to FIG. 8, the negative electrode 220 is shown formed of a first electrode member 220A and a second electrode member 220B. The first and second electrode members 220A and 220B are each separately formed by folding a continuous sheet of electrochemically active material into a semi-cylindrical tube configuration as shown in FIG. 10. The first electrode member 220A is shown formed by folding a sheet of zinc to form multiple layers 242 which are substantially parallel to each other and are substantially perpendicular to the interface surface of the cathode 14. Adjacent layers 242 are interconnected via fold segments 246 and are separated via slots (openings) 244. Accordingly, the continuous zinc sheet includes folds, such as perforations, that allow the zinc sheet to be folded into the configuration as shown. It should be appreciated that the second electrode member 220B is likewise formed in a manner similar to that shown for the first electrode member 220A.

As is shown in FIGS. 8 and 9, the first and second electrode members 220A and 220B of negative electrode 220 are disposed within the inner walls of separator 16. The first electrode member 220A extends an angular distance of slightly less than one hundred eighty degrees (180°), while the second electrode member 220B is diametrically opposed to the first member 220A and likewise extends through an angular rotation of slightly less than one hundred eighty degrees (180°).

The current collector 240 is disposed within a hollow cavity provided between the first and second electrode members 220A and 220B and in contact with the first and second electrode members 220A and 220B to provide an electrical connection between the negative electrode 220 and the outer negative cover 36. The current collector 240 includes a J-shaped or U-shaped lower section which is generally oversized relative to the distance between the first and second electrode members 220A and 220B and provides a bias force radially outward so as to force both of the first and second electrode members 220A and 220B apart from one another and into forced contact with the separator 16 so as to minimize the separation distance between the anode 220 and cathode 14. As a result of this configuration, the first and second electrode members 220A and 220B are separated from each other by a small gap 250.

An electrochemical cell 310 having a negative electrode 320 according to a fourth embodiment of the present invention is shown in FIGS. 11–13. Referring to FIG. 12, the negative electrode 320 is made up of a continuous piece of electrochemically active material having overlapping layers in the general shape of a coiled strip. The overlapping layers are preferably corrugated so as to define protrusions (openings) 344 between the adjacent layers to allow electrolyte to occupy the volume between adjacent layers and allow enhanced ion permeation. The negative electrode 320 has a hollow central region into which the alkaline electrolyte solution, such as a gelled electrolyte having a precipitating agent, is disposed as discussed above. The negative electrode 320 may be formed by passing a zinc wire between two rollers so as to form a flattened surface having corrugations formed therein.

While specific negative electrode constructions are shown and described herein, it should be appreciated by those skilled in the art that the number, size, and shape of the ribs, spines, steel can, and other elements may be varied to optimize performance for different cell constructions. By employing the inventive concepts of the negative electrodes according to the present invention, enhanced electrical cell performance, particularly at a high rate discharge, may be achieved, with a cell that is economical and easy to manufacture.

While the present invention has been described in connection with a negative electrode formed radially inward from the positive electrode, it should be appreciated that the electrode of the present invention may be employed as an external electrode formed against the inner wall of the steel can and having the opposite polarity electrode disposed radially inward thereof. It should also be appreciated that the electrode having the electrode configuration of the present invention, while described herein in connection with a negative electrode (i.e., anode), could be the positive electrode (i.e., cathode). Additionally, although the present invention is described as a primary alkaline cell, the inventive electrode structure could be utilized in other primary cell chemistries, such as carbon-zinc or lithium cells, or in rechargeable cells, such as nickel cadmium, nickel metal hydride, or Li-ion cells. Thus, the electrode configuration could be made up of any of the electrochemically active materials used for the positive or negative electrodes in such cells. For example, the electrode configuration could be made up of a compound including at least one material selected from the group consisting of cadmium, nickel, metal hydride, lithium, cobalt, manganese dioxide, zinc, and carbon.

Although the present invention has been shown and described with reference to cylindrical cells, it should be appreciated by those skilled in the art that the zinc negative electrode of the present invention may be employed in other electrochemical cells, such as prismatic cells. Additionally, the negative electrode of the present invention may be used in cells having essentially any cell construction.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container;
   a first electrode disposed in said container;
   a second electrode disposed in said container, said second electrode including a unitary piece of electrochemically active material having a circumferential surface and multiple openings formed in the circumferential surface;
   a separator located between the first electrode and the second electrode; and
   an electrolyte.

2. The electrochemical cell as defined in claim 1, wherein said piece of electrochemically active material includes a hollow cylindrical tube having slots formed therein and configured to provide a spine and a plurality of ribs supported by said spine.

3. The electrochemical cell as defined in claim 1, wherein said piece of electrochemically active material comprises a first member and a second member, each of said first and second members having a spine and a plurality of ribs supported by the spine.

4. The electrochemical cell as defined in claim 3 further comprising a current collector in contact with said first and second members and biasing the first and second members toward the separator.

5. The electrochemical cell as defined in claim 1, wherein said piece of electrochemically active material comprises a first member and a second member, each of said first and second members comprising a folded sheet of electrochemically active material.

6. The electrochemical cell as defined in claim 5 further comprising a current collector in contact with said first and second members and biasing the first and second members toward the separator.

7. The electrochemical cell as defined in claim 1, wherein said piece of electrochemically active material comprises a coiled piece of electrochemically active material with overlapping layers.

8. The electrochemical cell as defined in claim 7, wherein a surface of the coiled piece of material comprises protrusions.

9. The electrochemical cell as defined in claim 1 further comprising a central cavity provided in said second electrode and containing at least some of said electrolyte.

10. The electrochemical cell as defined in claim 9, wherein said at least some of said electrolyte contained in the central cavity comprises a precipitating agent.

11. The electrochemical cell as defined in claim 1, wherein said electrolyte comprises an alkaline electrolyte.

12. The electrochemical cell as defined in claim 1, wherein said electrochemically active material comprises zinc.

13. The electrochemical cell as defined in claim 1 further comprising a current collector in contact with said second electrode.

14. The electrochemical cell as defined in claim 1, wherein said second electrode is a positive electrode and said first electrode is a negative electrode.

15. The electrochemical cell as defined in claim 1, wherein said first electrode is disposed about the periphery of said second electrode.

16. The electrochemical cell as defined in claim 1, wherein said container is a cylindrical can.

17. The electrochemical cell as defined in claim 1, wherein the multiple openings are formed substantially perpendicular to an interface surface of the first electrode.

18. An electrochemical cell comprising:
   a container;
   a first electrode disposed in said container and having a wall defining an interface surface;
   a second electrode disposed in said container, said second electrode including a hollow tube of electrochemically active material having slots formed therein and configured to provide at least one spine and a plurality of substantially parallel ribs supported by said spine, wherein said ribs are oriented substantially perpendicular to the interface surface of the first electrode;
   a separator located between the first electrode and the second electrode; and
   an electrolyte.

19. The electrochemical cell as defined in claim 18, wherein said tube is substantially cylindrical.

20. The electrochemical cell as defined in claim 18, wherein said electrochemically active material comprises zinc.

21. The electrochemical cell as defined in claim 20 further comprising a precipitating agent disposed in a central opening in the tube for influencing precipitation of zinc oxide.

22. An electrochemical cell comprising:
   a container;
   a first electrode disposed in said container and having a wall defining an interface surface;
   a second electrode disposed in said container, said second electrode including a first member of electrochemically active material having a first spine and a first plurality of ribs supported by said first spine, said second electrode further including a second member of electrochemically active material comprising a second spine and a second plurality of ribs supported by said second spine, wherein said first and second plurality of ribs are oriented substantially perpendicular to said interface surface;
   a separator located between the first electrode and the second electrode; and
   an electrolyte.

23. The electrochemical cell as defined in claim 22 further comprising a current collector in contact with said first and second members of said second electrode and biasing the first and second members towards the separator.

24. The electrochemical cell as defined in claim 22, wherein said electrochemically active material comprises zinc.

25. The electrochemical cell as defined in claim 22 further comprising a precipitating agent disposed in a central opening in the second electrode for influencing precipitation of zinc oxide.

26. The electrochemical cell as defined in claim 22, wherein said first and second members each comprise substantially semi-cylindrical members.

27. An electrochemical cell comprising:
   a container;
   a first electrode disposed in said container and having a wall defining an interface surface;
   a second electrode disposed in said container, said second electrode including a first member of electrochemically active material folded into multiple layers oriented substantially perpendicular to the interface surface of said first electrode, said second electrode further including a second member of electrochemically active material folded into multiple layers oriented substantially perpendicular to the interface surface of said first electrode;
   a separator located between said first electrode and said second electrode; and
   an electrolyte.

28. The electrochemical cell as defined in claim 27 further comprising a current collector in contact with the first and second members and biasing the first and second members towards the separator.

29. The electrochemical cell as defined in claim 27, wherein said material comprises zinc.

30. An electrochemical cell comprising:
   a container;
   a first electrode disposed in said container and having a wall defining an interface surface;
   a second electrode disposed in said container, said second electrode including a coiled piece of electrochemically active material forming multiple overlapping layers oriented substantially perpendicular to the interface surface of said first electrode;
   a separator disposed between the first electrode and the second electrode; and
   an electrolyte.

31. The electrochemical cell as defined in claim 30, wherein a surface of the coiled piece of material comprises protrusions.

32. An electrode for use in an electrochemical cell, said electrode comprising:
   a unitary piece of electrochemically active material having a circumferential surface and multiple openings formed in the circumferential surface.

33. The electrode as defined in claim 32, wherein said unitary piece comprises a hollow tube of electrochemically active material having a plurality of slots formed therein to provide a spine and a plurality of ribs supported by the spine, wherein the plurality of ribs are adapted to be oriented substantially perpendicular to an interface area of another electrode.

34. The electrode as defined in claim 32, wherein said unitary piece comprises:
   a first member formed of an electrochemically active material having a first spine and a first plurality of ribs supported by the spine; and
   a second member of electrochemically active material having a second spine and a second plurality of ribs supported by the second spine, wherein the first and second members are adapted to be oriented diametrically opposed to one another and oriented substantially perpendicular to an interface surface of another electrode.

35. The electrode as defined in claim 32, wherein said piece of electrochemically active material comprises a first member and a second member, each of said first and second members comprising a folded sheet of electrochemically active material.

36. The electrochemical cell as defined in claim 32, wherein said piece of electrochemically active material comprises a coiled piece of electrochemically active material with overlapping layers.

37. The electrode as defined in claim 32 wherein said electrode comprises a negative electrode.

38. The electrode as defined in claim 32, wherein the openings are adapted to be oriented substantially perpendicular to an interface area of another electrode.

* * * * *